UNITED STATES PATENT OFFICE.

JOHN W. VOGLESONG, OF ELYRIA, OHIO, ASSIGNOR TO PITTSBURGH PLATE GLASS COMPANY, OF PITTSBURGH, PENNSYLVANIA, A CORPORATION OF PENNSYLVANIA.

PLASTER-BOARD COMPOSITION.

1,066,867.      Specification of Letters Patent.      Patented July 8, 1913.

No Drawing.      Application filed August 8, 1908. Serial No. 447,551.

*To all whom it may concern:*

Be it known that I, JOHN W. VOGLESONG, a citizen of the United States, residing at Elyria, Ohio, have invented certain new and useful Improvements in Plaster-Board Compositions, of which the following is a specification.

The invention has reference to compositions for use in the formation of the flat sheets of material known as plaster board, it being understood, however, that the material or composition is also applicable in the formation of partition blocks and other analogous articles.

The most important of the objects of my present invention is the provision of a composition capable of forming a board of the character specified of greater strength than those made according to processes heretofore employed, and which will also stand shipment better than those heretofore produced; and the provision of a composition which by reason of the elements used, permits of a material reduction in the time necessary to compact the material into a board where such compacting is accomplished by what is known as the hydro-press method.

The above as well as such other objects as may hereinafter appear I attain by combining with plaster of Paris and a sufficient quantity of water, a certain amount of cement, and adding to the whole some kind of strengthening material or binding substance, such for example as wood fiber which is the material I prefer.

In experimenting I find that a proportion which gives good results is about nine of plaster to one of cement with a comparatively small amount of wood fiber and just enough water to carry out the operation of manufacturing the board and cause the plaster to set properly, it being necessary of course where the hydro-press method of manufacture so called is employed, to drive a certain amount of water through the deposited material when the substances have been mixed and the material deposited on the necessary form, and I find that the addition of the cement permits the water to pass through the composition with greater rapidity and, as indicated, very materially reduces the time necessary in the formation of the board, in some cases even cutting it down one-half or more, thus enormously increasing the facility with which the boards can be turned out of any given machine. In the hydro-press method, a mixture of the composition together with a large amount of water is subjected to air pressure driving the composition against foraminous formers in such way that the solid particles are deposited in a uniformly mixed and distributed mass, each particle being subjected to pressure as it is deposited. A board is thus produced which is uniformly compacted throughout the mass. Such a board is very much stronger and more durable than one in which the material is merely allowed to harden without compacting, or in which pressure has been applied only to the exterior surfaces of the formed board leaving the interior comparatively soft.

I find that good results are also obtained by adding to the wood fiber some small quantity of paper scrap or small pieces, the paper apparently tending to aid the fiber in binding the whole into a solid mass when formed. In the customary operation of forming boards with my improved composition I also find that the best results are obtained by mixing the wood fiber and paper and a slight quantity of water separately from the plaster and cement and water, the whole being finally put together in the last stage of the operation. The cement in the composition not only increases the rapidity with which the board may be formed, but also adds considerable strength to the completed board.

Having thus described my invention and illustrated its use, what I claim as new and desire to secure by Letters Patent is the following:—

A plaster board composition comprising approximately nine parts of plaster of Paris to one of cement with a relatively small amount of wood fiber and sufficient water to wet the mixture.

In testimony whereof I have hereunto signed my name in the presence of the two subscribed witnesses.

JOHN W. VOGLESONG.

Witnesses:
   WILSON ROGERS,
   H. WELLS.